United States Patent
Shama et al.

(10) Patent No.: US 9,887,925 B2
(45) Date of Patent: Feb. 6, 2018

(54) NETWORK PERFORMANCE ENHANCEMENT

(71) Applicant: Gilat Satellite Networks Ltd., Petah Tikva (IL)

(72) Inventors: Micheal Shama, Tel-Aviv (IL); Yoseph Hecht, Rehovot (IL); Eldad Yitzhaki, Tel Mond (IL)

(73) Assignee: Gilat Satellite Networks Ltd., Petah Tikva (IL)

( * ) Notice: Subject to any disclaimer, the term of this patent is extended or adjusted under 35 U.S.C. 154(b) by 314 days.

(21) Appl. No.: 14/090,024

(22) Filed: Nov. 26, 2013

(65) Prior Publication Data

US 2014/0250237 A1  Sep. 4, 2014

Related U.S. Application Data

(60) Provisional application No. 61/772,211, filed on Mar. 4, 2013.

(51) Int. Cl.
*G06F 15/16* (2006.01)
*H04L 12/805* (2013.01)

(52) U.S. Cl.
CPC .................. *H04L 47/36* (2013.01)

(58) Field of Classification Search
CPC .............. H04L 47/125; H04L 47/36
See application file for complete search history.

(56) References Cited

U.S. PATENT DOCUMENTS

| 7,286,476 B2* | 10/2007 | Helmy | H04L 69/16 370/230.1 |
|---|---|---|---|
| 7,304,959 B1* | 12/2007 | Swaroop | H04L 12/66 370/233 |
| 7,542,471 B2* | 6/2009 | Samuels | H04L 69/16 370/392 |
| 2003/0123481 A1* | 7/2003 | Neale | H04B 7/18582 370/466 |
| 2010/0322249 A1* | 12/2010 | Thathapudi | H04L 47/10 370/395.1 |
| 2012/0281559 A1* | 11/2012 | Ner | H04W 28/06 370/252 |

* cited by examiner

*Primary Examiner* — Philip Chea
*Assistant Examiner* — Robert B McAdams
(74) *Attorney, Agent, or Firm* — Banner & Witcoff, Ltd.

(57) ABSTRACT

Methods for overcoming latency and throughput degradation ensuing from packet fragmentation performed at a source node are disclosed. Some embodiments of the disclosed methods may be applicable to networks in which performance enhancement methods are used, including but not limited to TCP acceleration methods. In some embodiments, the disclosed methods may include determining an MTU for a session based on one or more fragmentation policies. Also disclosed is a satellite communication system that may be configured to resolve one or more detrimental effects on TCP spoofing resulting from the MTU discovery mechanism of IPv6.

29 Claims, 3 Drawing Sheets

NETWORK PERFORMANCE ENHANCEMENT

PRIORITY CLAIM

This application claims priority to U.S. Provisional Patent Application Ser. No. 61/772,211, filed Mar. 4, 2013, and entitled "Network Performance Enhancement," the disclosure of which is incorporated by reference herein in its entirety and made part hereof.

FIELD

Aspects of the disclosure pertain to networking over high-latency links. Further aspects of the disclosure pertain to acceleration of networking protocols in networks comprising such high-latency links.

BACKGROUND

In an Internet Protocol version 4 (IPv4) network, a source node can send a datagram of any size that its local link can handle. At least one router along the datagram's path may fragment the datagram, if such fragmentation is needed. However, this approach to datagram fragmentation increases the load on the network's routers and causes degradation in their performance. Since it is much more efficient for a router to forward datagrams intact rather than to occupy its processor with the task of datagram fragmentation, delegating the responsibility of adjusting the datagram to an appropriate size from the routers to the source node is a called for approach. Indeed, the Internet Protocol version 6 (IPv6) standards adopt the latter approach and specify that fragmentation of packets (datagrams) has to be performed only at the source node (as stated in RFC 2460, paragraph 4.5: "unlike IPv4, fragmentation in IPv6 is performed only by source nodes, not by routers along a packet's delivery path"). Thus, in an IPv6 network, when a packet arrives at an intermediate link associated with a Maximum Transmission Unit (MTU) size smaller than the packet size, the packet is discarded and an Internet Control Message Protocol Packet Too Big (ICMP PTB) message is sent back to the packet's origin (as defined in RFC-1981).

In general, the term maximum transmission unit may refer to any characteristic that may be associated with a link and which may limit the transmission of a packet over that link due to the packet having a property exceeding and/or conflicting with said characteristic of that link, including, for example, a Maximum Transmission Unit (MTU) characteristic under IPv6 and/or a similar characteristic under another protocol other than IPv6. Similarly, the packet too big indication may be any indication that a packet exceeds some predetermined size and may include, for example, a PTB message under IPv6 and/or a similar indication in another protocol other than IPv6.

An IPv6 network can include a high-latency link followed by several other links. In such a network, it is possible that each one of the other links will be associated with a different MTU. In the worst case scenario, these other links are arranged in a descending MTU order. If the source node has no knowledge of the smallest MTU along the path from the source node to the final destination of the packets being transmitted, packets may be discarded by one or more routers controlling the said other links until the ICMP PTB message corresponding to the link having the smallest MTU arrives at the source node and the source node accordingly adjusts the size of the packets it sends to the destination.

Let TI be the round trip time measured from the time a packet is sent by a source node until an ICMP PTB message is received at the source node.

Let BR be the transmission rate at the source node.

Let n be the number of links in the path (i.e., between the source node and the destination of the packets being sent by the source node) with MTU smaller than the packet size originally used by source node, and assume the links in the path after the high-latency link are arranged in descending MTU order.

Thus, the number of Bytes discarded during a TI time interval equals the transmission rate times TI (Discarded Bytes=BR*TI) and the total latency in delivering a packet (and hence, of an entire session) will be n*TI. In a satellite network, TI is relatively long, typically longer than 500 milliseconds, wherein the terrestrial network after the satellite link prolongs the above interval even further.

In order to overcome the delay of high-latency links, acceleration techniques are applied, such as Transmission Control Protocol (TCP) spoofing. In a TCP spoofing technique, a node at the near edge of the long latency link simulates a destination node located at the other side of the long latency link in order to enhance TCP performance. This edge node then uses a protocol better suited for communicating over the long latency link in order to reliably convey the information to the destination node at the other side of the long latency link.

Significant packet loss that could be caused by MTU mismatch along the packet transmission path may interfere with TCP acceleration techniques. Such interference may result in detrimental effects such as additional delay (including TCP back-off delay), throughput reduction (due to TCP mechanisms detecting packet loss and reducing the transmission window size), bandwidth waste (due to retransmission of packets) and unpredictable results when an ICMP PTB is received at the source node for a packet that was already acknowledged by the TCP spoofing mechanism.

SUMMARY

The following presents a simplified summary in order to provide a basic understanding of some aspects of the disclosure. The summary is not an extensive overview of the disclosure. It is intended neither to identify key or critical elements of the disclosure nor to delineate the scope of the disclosure. The following summary merely presents some aspects of the disclosure in a simplified form as a prelude to the description below.

Aspects of the disclosure may be directed to methods for avoiding detrimental effects of the IPv6 mechanism for MTU discovery on TCP acceleration methods (e.g., TCP spoofing). In some embodiments, the methods may include steps that may be performed at both ends of a high-latency link. In some embodiments, a spoofing algorithm may be performed at a node at each end of the high-latency link.

Aspects of the disclosure may be directed to a satellite communication system comprising a hub and at least one terminal, the hub and/or the terminal may be configured to use one or more performance enhancement algorithms, such as but not limited to at least one TCP acceleration method (e.g., TCP spoofing), wherein the hub and/or the terminal may be configured to resolve one or more detrimental effects on TCP spoofing resulting from the MTU discovery mechanism of IPv6.

BRIEF DESCRIPTION OF THE DRAWINGS

Figure 1:
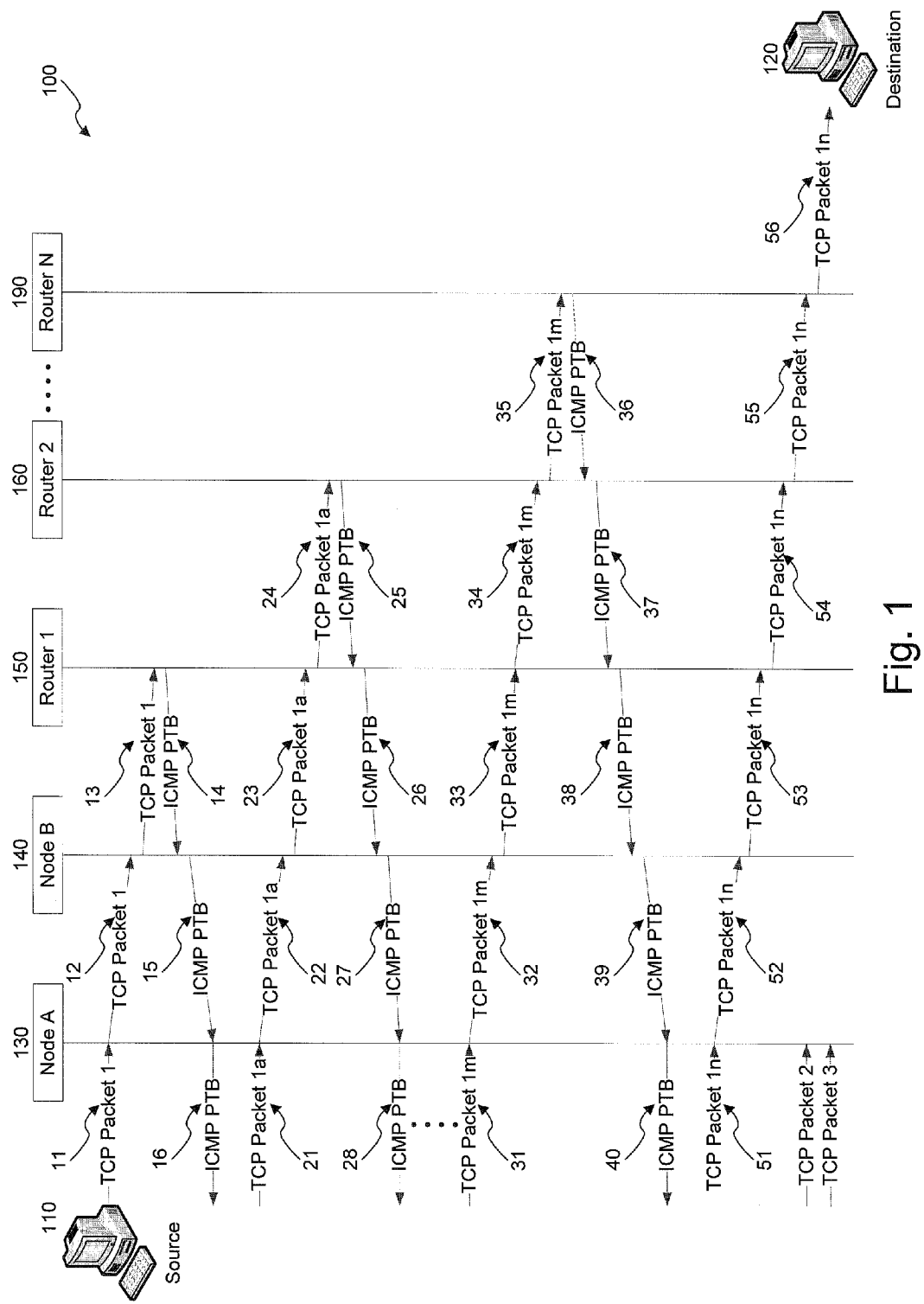
Figure 2:
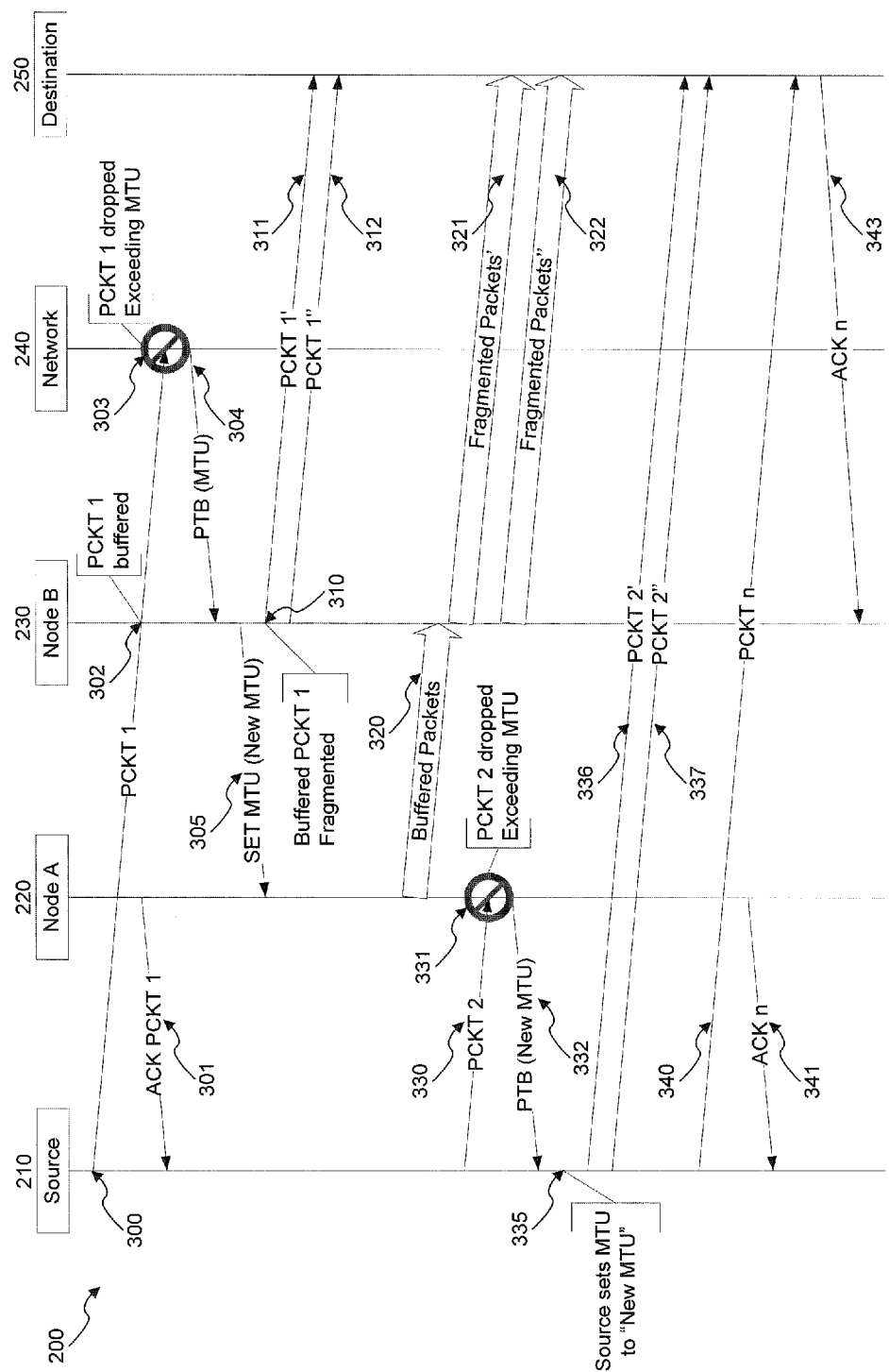
Figure 3:
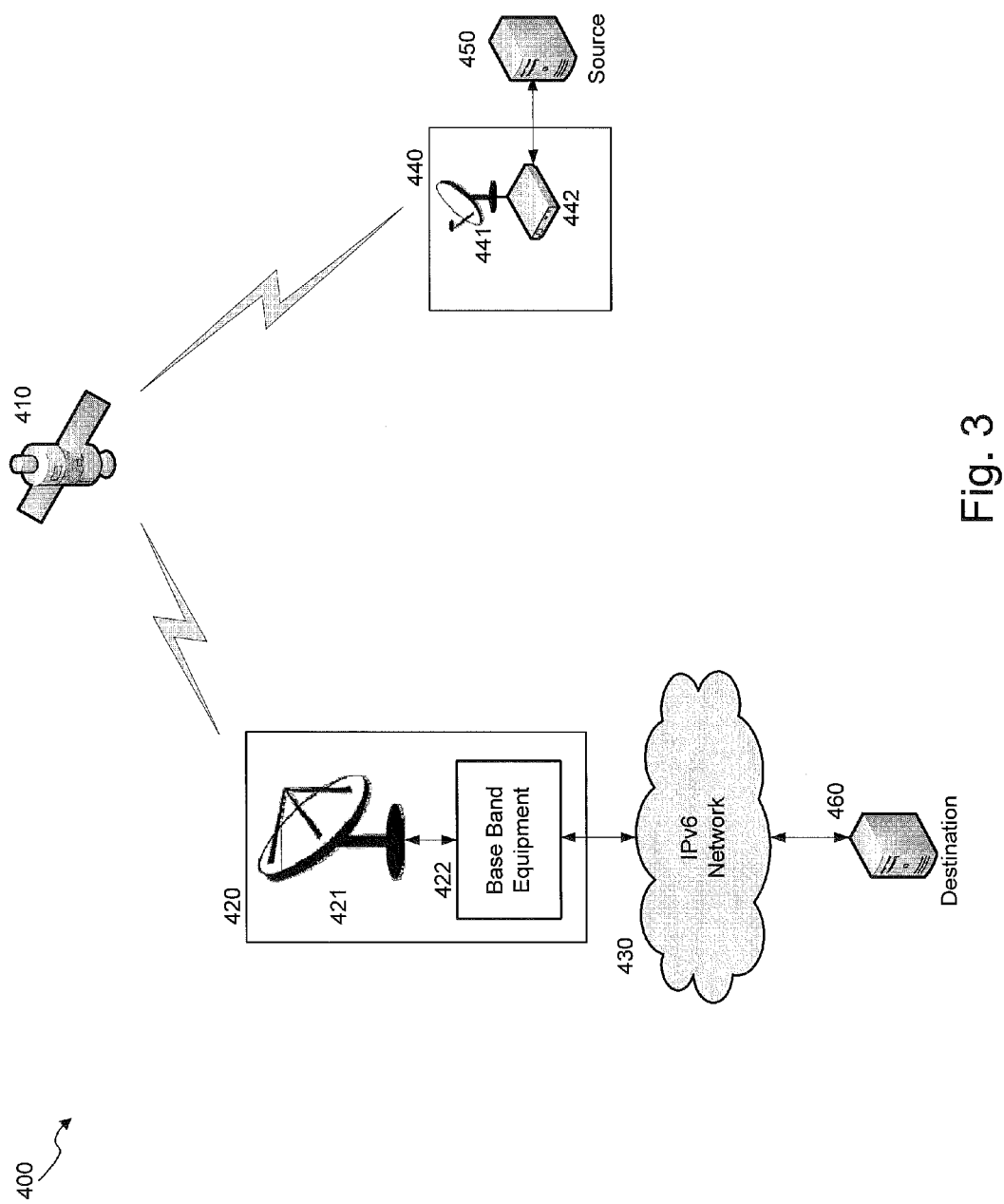

Having thus described the disclosure in general terms, reference will now be made to the accompanying drawings, which are not necessarily drawn to scale, and wherein:

FIG. 1 shows an exemplary effect of the IPv6 approach to packet fragmentation on packet delivery delay;

FIG. 2 shows an exemplary illustration of a method for mitigating the IPv6 approach to packet fragmentation in accordance with aspects of the disclosure; and FIG. 3 shows an example of a satellite communication system in accordance with aspects of the disclosure.

DETAILED DESCRIPTION

FIG. 1 shows an exemplary effect of the IPv6 approach regarding packet fragmentation on packet delivery delay.

Packets may be sent from a source (110) via a series of nodes toward a destination (120). The series of nodes may include nodes A and B (130 and 140 respectively) and a series of routers (e.g., 150, 160 and 190), wherein the source may be connected to Node A (130) and the destination may be connected to the last router, e.g., Router N (190). In some embodiments, the link between nodes A and B may be associated with high latency.

As shown in FIG. 1, the source (110) may send a first TCP packet (11) toward the destination (120). The first TCP packet may reach node A (130) and then be transmitted (12) toward node B (140). From node B (140), the first TCP packet may be forwarded (13) to Router 1 (150), which may be the first router in the path toward the destination (120). As the initial size of the first TCP packet may be larger than the maximum packet size that may be supported on the link between Router 1 (150) and Router 2 (160), Router 1 (150) may discard the first TCP packet (13) and respond with an ICMP PTB (Packet Too Big) message (14). The ICMP PTB message (14) may then be carried all the way back (15 and 16) to the source (110).

Upon receiving the ICMP PTB message (16), the source (110) may set its MTU size in accordance with the MTU size indicated in the received ICMP PTB message (16), fragment the first TCP packet in accordance with the newly set MTU size and send the fragmented TCP packet (21) toward the destination (22, 23 and 24), this time with the packet size fitting the capabilities of the link between Router 1 (150) and Router 2 (160). However, as shown in FIG. 1, the size of the fragmented TCP packet (21) may still exceed the maximum packet size that may be supported on the link between Router 2 (160) and the next router along the path to the destination (120), e.g., Router N (190). Thus, Router 2 (160) may discard the fragmented TCP packet (24) and respond with an ICMP PTB message (25). The ICMP PTB message (25) may then be carried all the way back (26, 27 and 28) to the source (110).

Upon receiving the second ICMP PTB message (28), the source (110) may set its MTU size in accordance with the MTU size indicated in the received second ICMP PTB message (28), re-fragment the first TCP packet in accordance with the newly set MTU size and send the re-fragmented TCP packet (31) toward the destination (32, 33, 34 and 35), this time with the packet size fitting the capabilities of all the links until Router N (190). However, as shown in FIG. 1, the size of the fragmented TCP packet (31) may still exceed the maximum packet size that may be supported on the link between the last router, e.g., Router N (190) and the destination (120). Thus, Router N (190) may discard the fragmented TCP packet (35) and respond with an ICMP PTB message (36). The ICMP PTB message (36) may then be carried all the way back (37, 38, 39 and 40) to the source (110).

Upon receiving the last ICMP PTB message (40), the source (110) may set its MTU size in accordance with the MTU size indicated in the received last ICMP PTB message (40), re-fragment yet again the first TCP packet in accordance with the newly set MTU size and send the re-fragmented TCP packet (51) toward the destination (52, 53, 54, 55 and 56), this time with the packet size fitting the capabilities of all the links until the destination (120). At last, the first TCP packet may arrive at the destination (120).

As the link between nodes A and B (130 and 140 respectively) may be associated with high latency, the accumulated delay in delivering the first TCP packet from source (110) to destination (120) may include (e.g., in addition to the delay associated with the last and successful attempt) N high-latency round trips (e.g., over the high-latency link between nodes A and B) plus additional lower latency round trips (e.g., between the routers 150 to 190, up to $(N^2+N)/2$ in the worst case scenario). It may be noted that FIG. 1. illustrates the delay incurred due to retransmissions, yet other detrimental aspects of the problem might not be shown.

Aspects of the disclosure may be directed to methods for resolving one or more detrimental effects on TCP spoofing resulting from the MTU discovery mechanism of IPv6. In some embodiments, the methods may include steps to be performed at both ends of a high-latency link over which a TCP acceleration method (e.g., a spoofing method) may be applied.

In some embodiments, the disclosed methods may be used for resolving similar effects that may be caused by the MTU discovery mechanism of IPv6 on communication protocols other than TCP. In one example, the disclosed methods may be used in conjunction with the UDP-based (UDP—User Datagram Protocol) Stream Control Transmission Protocol (SCTP), e.g., when SCTP may be used in its reliable profile. In another example, the disclosed methods may be used in conjunction with the TCP-based X.25 over TCP (XOT) protocol, e.g., where spoofing may be applied to layers above the transport layer (e.g., in addition to TCP spoofing). In yet another example, the disclosed methods may be used in conjunction with the UDP-based Trivial File Transmission Protocol (TFTP). Thus, it should be appreciated by any person skilled in the art that the disclosed methods may be used at least in conjunction with any protocol that may be spoofed (e.g., for acceleration), that the description below refers to TCP as an example for a spoofed protocol, and that the description below does not limit the disclosed methods for use with TCP or with any other protocol.

Referring to FIG. 2, node A (220) and node B (230) may be connected by a high-latency link. Though packets may be sent across the high-latency link in either direction, for the sake of simplifying the description herein, FIG. 2 may show an example in which a packet may be sent from a source (210), which may be connected to node A (220), to a destination (250), via node B (230) and perhaps further via a network (240), which may include any number of nodes in the path between node B (230) and the destination (250). In some embodiments, said network (240) may be an IPv6 network.

The source (210) may send (300) a first (TCP) packet (PCKT 1) to the destination (250) via nodes A and B (220 and 230 respectively) and further via said network (240), as described above. The first (TCP) packet may arrive at node A (220), which may be configured to forward the first (TCP) packet to node B (230). Since node A (220) may be connected to node B (230) by a high-latency link, node A (220) may be configured to employ a method for at least the purpose of accelerating TCP traffic (e.g., a TCP spoofing method). Thus, if the first (TCP) packet is a TCP packet, node A (220) may be configured to create a spoofed TCP acknowledgement (301) for the first (TCP) packet.

Node B (230) may be configured to receive (TCP) packets sent by node A (220) over the high-latency link, to store copies of (e.g., buffer) the (TCP) packets, for example until acknowledgements for their correct reception at a destination is received, and to forward the packets toward their respective destinations, e.g., via said network (240). Thus, upon receiving said first (TCP) packet, node B (230) may store a copy of the first (TCP) packet (302) and forward the first (TCP) packet toward the destination (250), e.g., via said network (240).

However, said network (240) may include a link associated with an MTU smaller than the size of the first (TCP) packet. Thus a node in said network (240), which may be connected to the said link, may drop the first (TCP) packet (303) and respond with a packet too big (PTB) indication or message (304). In some embodiments, wherein the network (240) may be an IPv6 network, said PTB indication or message may be sent as an ICMP PTB message.

Upon receiving a PTB message (304) corresponding to the first (TCP) packet, node B (230) may be configured to associate a session (e.g., a TCP session) corresponding to the first (TCP) packet with a new MTU, wherein the new MTU may correspond and/or otherwise be derived from an MTU indication included in the received PTB message (e.g., as further described herein), to send an indication including the new MTU associated with said session (305) to node A (220), to fragment the first (TCP) packet in accordance with said new MTU (310), and to send the fragmented first (TCP) packet (311 and 312) (PCKT 1' and PCKT 1" respectively) toward the destination (250).

Following fragmentation of the first (TCP) packet, node B (230) may determine that it may have in storage copies of additional (TCP) packets associated with the session corresponding to the first (TCP) packet. In some embodiments, said additional (TCP) packets may have already been sent toward the destination (250) and not yet acknowledged (not shown in FIG. 2). Any number of these additional (TCP) packets may be of lengths exceeding the new MTU associated with said session. Thus, in some embodiments, node B (230) may be further configured to determine whether a copy of at least a second (TCP) packet is in storage, wherein the second (TCP) packet may be associated with said session and may be of a length exceeding the new MTU associated with the session, and node B (230) may be configured to, upon so determining, fragment the at least second (TCP) packet and to send the fragmented at least second (TCP) packet toward the destination (250) (not shown in FIG. 2).

As it may take some time for the indication including the new MTU associated with said session (305) to reach node A (220) (e.g., even over a low-latency link and all the more so over a high-latency link), during that time, node A (220) may transmit additional (TCP) packets associated with said session toward the destination (250) via nodes A and B (220 and 230 respectively) (not shown in FIG. 2). Even after receiving said indication including the new MTU associated with said session (305), node A (220) may already have some (TCP) packets associated with said session already queued for transmission (320) (Buffered Packets) and thus node A (220) may transmit these queued (TCP) packets without fragmenting them, even if such fragmentation may be needed in accordance with the indicated new MTU (305). Thus, in some embodiments, node B (230) may be further configured to determine upon receiving a third (TCP) packet (e.g., 320) (e.g., from node A (220)) that the third (TCP) packet (e.g., 320) may be associated with the session corresponding to the first (TCP) packet and that the third (TCP) packet may be of a length exceeding the new MTU associated with the session. Node B (230) may be further configured to, upon so determining, fragment the third (TCP) packet in accordance with the new MTU associated with said session and to transmit the fragmented third (TCP) packet (e.g., 321 and 322) (e.g., Fragmented Packets' and Fragmented Packets" respectively) toward the destination (250).

Furthermore, on the other side of the high-latency link, node A (220) may be configured to receive an indication (e.g., from node B (230)) including a new MTU associated with a session (305), and to update the session's MTU in accordance with the indicated new MTU. Node A (220) may be further configured, e.g., once the MTU for the session may have been updated, to determine for a fourth (TCP) packet (330) (PCKT 2) arriving from the source (210) whether the fourth (TCP) packet (330) is associated with said session and whether its size exceeds the updated MTU associated with the session. Node A (220) may be configured to discard the fourth (TCP) packet upon determining that its length exceeds the updated MTU (331), and to send a PTB message (332) corresponding to the discarded fourth (TCP) packet toward the source (210). In some embodiments, wherein the link between source (210) and node A (220) may be an IPv6 link, said PTB message may be sent as an ICMP PTB message.

It may be noted that node A (220) may be configured not to fragment any packet arriving from the source (210), regardless of whether that packet is received from the source (210) before or after receiving (e.g., from node B (230)) an indication with a new MTU. This approach may be at least for the purpose of minimizing retransmissions over the high-latency link. In some embodiments, wherein the high-latency link may be a satellite link, the above described approach may lead to minimizing retransmissions over the (relatively expensive) satellite resources, thus increasing the efficiency at which the satellite resources may be utilized.

It may also be noted, that node A (210) may discard the fourth (TCP) packet and send said corresponding PTB message (332) even though the high-latency link connecting nodes A and B (220 and 230 respectively) may support an MTU at least as large as the size of the fourth (TCP) packet. Thus, the response of node A (220) to the fourth (TCP) packet may be considered to be a spoofed response, e.g., node A (220), knowing that a lower MTU link may exist on the path to the destination (250), may generate a response on behalf of another node on that path. By being so configured, node A (220) may at least maintain proper operation of at least a TCP spoofing mechanism that node A (220) may be configured to employ, reduce the overall latency in delivering at least the fourth (TCP) packet, and reduce the load on any of the links and/or the nodes on the path to the destination (250), including node B (230) and the high-latency link connecting nodes A and B (220 and 230 respectively).

Upon receiving a PTB message (332) corresponding to a previously sent (TCP) packet (330) (PCKT 2), source 210 may follow an MTU discovery procedure (for example, as defined in the IPv6 standards) and update the MTU for the respective session (335), e.g., in accordance with the new MTU as indicated in the received PTB message (332). The source (210) may then fragment the previously discarded (TCP) packet (e.g., the fourth (TCP) packet) and send the fragmented (TCP) packet (336 and 337) (PCKT 2' and PCKT 2" respectively) toward the destination (250).

Source (210) may also send additional (TCP) packets (340) (PCKT n), already sized in accordance with the updated new MTU toward the destination (250). In some embodiments, packets sent from the source (210) to the destination (250) may be TCP packets. In such embodiments, since node A (220) may be connected to node B (230) by a high-latency link, either node A (220) or node B (230), or both, may be configured to employ a TCP acceleration method (e.g., TCP spoofing). Thus, node A (220) may be configured to create spoofed acknowledgements (341) and transmit them toward the source (210), and/or node B (230) may be configured to terminate acknowledgements (343) (ACK n) received from the destination (250).

As previously mentioned, node B (230) may be configured to determine a new MTU for a session, for example, upon receiving a PTB message (304) corresponding to a (TCP) packet associated with the said session, wherein the determined new MTU may correspond and/or otherwise be derived from an MTU indication included in a received PTB message. In some embodiments, said determining of a new MTU may be based on a packet fragmentation policy, which node B (230) may be configured to employ, e.g., for at least the purpose of optimizing overall efficiency considering the given network (240).

Node B (230) may be configured to set the new MTU to a value between the MTU indicated in a received PTB message (e.g., 304) and the lowest MTU that may be supported, for example, in accordance with standards that may be applicable to the network (240), wherein the MTU indicated in a received PTB message may be higher or equal to the applicable lowest MTU. In some embodiments, for example, where the network (240) may be an IPv6 network, the applicable lowest MTU may be of 1280 bytes.

In some embodiments, node B (230) may be configured, e.g., upon receiving a PTB message, to set the new MTU as largely as possible, e.g., to the MTU indicated in a received PTB message. While such setting may result in high transport efficiency (e.g., due to reducing the number of packets required for transmitting a given content, which in turn may result in less overhead (e.g., due to transmitting less packet headers) and in reduced load on the network nodes), such setting may also increase the probability for receiving another PTB message from another node in the network (240) (e.g., due to an additional limited link in the network (240)).

In some embodiments, node B (230) may be configured, e.g., upon receiving a PTB message, to set the new MTU to the lowest MTU that may be supported. While such setting may ensure no additional MTU changes during the session, such setting may also result in higher load on the network nodes (e.g., due to a larger number of packets that may be required for transmitting a given content) and/or in reduced efficiency (e.g., due to having packet overheads transmitted more times).

In some embodiments, node B (230) may be configured, e.g., upon receiving a PTB message, to determine whether the received PTB message is the first PTB message received for the corresponding session, and to set the new MTU in accordance with that determining. For example, in some embodiments, Node B (230) may be configured to set the new MTU to the MTU indicated in the received PTB message (e.g., as largely as possible) if the received PTB message is the first PTB message received for the corresponding session, and to set the new MTU to the lowest MTU that may be supported if the received PTB message is not the first PTB message received for the corresponding session. In such embodiments, there may be no more than two (2) MTU changes in a session. In some embodiments, wherein more than two (2) MTU changes in a session may be allowed, node B (230) may be configured to set the new MTU to the MTU indicated in a last received PTB message (e.g., as largely as possible) if the number of received PTB messages associated with the session, including the last received PTB message, is lower than the number of MTU changes allowed in a session, and to set the new MTU to the lowest MTU that may be supported if the number of received PTB messages associated with the session, including the last received PTB message, equals or exceeds the number of MTU changes allowed in a session.

In some embodiments, node B (230) may be configured, e.g., upon receiving a PTB message, to set the new MTU to a value in between the MTU indicated in the received PTB message and the lowest MTU that may be supported, wherein determining the new MTU value may comprise any of performing calculations and/or applying one or more algorithms in order to determine the new MTU value. For example, in some embodiments, said algorithms and calculations may include use of weighted averaging between the MTU indicated in the received PTB message and the lowest MTU that may be supported, wherein the weights may be either predetermined or dynamically deduced based on accumulated experience. In some embodiments, said algorithms may include storing history of MTU changes and determining the new MTU based on said stored history.

In some embodiments, node B (230) may be configured, e.g., upon receiving a PTB message, to compare the MTU indicated in a received PTB message with a pre-defined MTU and to set the new MTU in accordance with said comparing. For example, if the MTU indicated in a received PTB message is lower than (or equal to) the pre-defined MTU, node B (230) may be configured to set the new MTU either to the MTU indicated in the received PTB message or to the lowest MTU that may be supported, or to any value in between, or in a manner similar to any of the embodiments previously described. In another example, if the MTU indicated in a received PTB message is higher than the predefined MTU, node B (230) may be configured to set the new MTU either to the MTU indicated in the received PTB message or to the predefined MTU, or to any value in between those MTU values, or in a manner similar to any of the embodiments previously described.

It may be appreciated by any person skilled in the art that additional policies for determining the new MTU may be used without departing from the scope of this disclosure.

FIG. 3 shows an example of a satellite communication system (400). The satellite communication system (400) may include a hub (420) (wherein the hub may comprise some outdoor equipment (421) and some baseband processing equipment (422)) and at least one terminal (440) (wherein the terminal may comprise some outdoor equipment (441) and a satellite modem or a satellite router (442)). In some embodiments, the terminal (440) may be a very small aperture terminal (VSAT). In some embodiments, the satellite communication system (400) may be a network with a plurality of terminals (e.g., like 440) while in some embodiments the hub (420) may also be a terminal (e.g., similar to 440) and the satellite communication system (400) may be a simple single channel per carrier (SCPC) link.

The hub (420) and the terminal (440) may be configured to communicate over the satellite (410). At least due to the latency introduced by the satellite link, the hub (420) and/or the terminal (440) may be configured to use one or more performance enhancement algorithms, such as but not limited to at least one TCP acceleration method (e.g., TCP spoofing).

In some embodiments, the hub (420) of the satellite communication system (400) may be connected to a network (430), wherein the network may include any number of nodes, including a destination node (460), and the terminal (440) may be connected to a source (450) or to a network (not shown in FIG. 3) containing the source (450). In some embodiments, the network (430) may be an IPv6 network and/or the terminal (440) may be connected to the source (450) (or to a network containing the source (450)) using an IPv6 link.

In aspects of the disclosure, said hub (420) and/or said terminal (440) may be configured to resolve one or more detrimental effects on TCP spoofing resulting from the MTU discovery mechanism of IPv6. Though packets may be sent from the hub (420) to the terminal (440) and/or from the terminal (440) to the hub (420), for the sake of simplifying the description herein, FIG. 3 may show an example in which a source (450) is connected to the terminal (440) and a destination (460) is connected to a network (430), which the hub (420) may be connected to as well.

The source (450) may send a first (TCP) packet to the destination (460) via the terminal (440), the hub (420) and further via the network (430) connecting the hub (420) and the destination (460). The first (TCP) packet may arrive at the terminal (440), which may be configured to forward the first (TCP) packet to the hub (420). At least due to the latency of the satellite link, the terminal (440) may be configured to employ a method for at least the purpose of accelerating TCP traffic (e.g., a TCP spoofing method) and thus, if the first (TCP) packet is a TCP packet, to send a spoofed TCP acknowledgement for the first (TCP) packet toward the source (450).

The hub (420) may be configured to receive the first (TCP) packet sent by the terminal (440) over the satellite link, to store a copy of the first (TCP) packet (for example, until acknowledgement(s) for its correct reception at the destination (460) is received), and to forward the first (TCP) packet toward the destination (460) via the network (430).

As the network (430) may include a link associated with an MTU smaller than the size of the first (TCP) packet, a node in the network (430) (e.g., connected to the said link) may drop the first (TCP) packet and respond with a packet too big (PTB) message, wherein if the network (430) is an IPv6 network said PTB message may be an ICMP PTB message. Thus, the hub (420) may be configured, e.g., upon receiving a PTB message corresponding to the first (TCP) packet, to associate a session (e.g., a TCP session) corresponding to the first (TCP) packet with a new MTU, wherein the new MTU may correspond and/or otherwise be derived from an MTU indication included in the received PTB message (e.g., as previously described above in reference to node B (230) of FIG. 2), to send an indication including the new MTU associated with said session to the terminal (440), to fragment the first (TCP) packet in accordance with said new MTU, and to send the fragmented first (TCP) packet toward the destination (460).

Following fragmentation of the first (TCP) packet, the hub (420) may determine that it may have in storage copies of additional (TCP) packets associated with the session corresponding to the first (TCP) packet. In some embodiments, said additional (TCP) packets may have already been sent toward the destination (460) and not yet acknowledged. Any number of these additional (TCP) packets may be of lengths exceeding the new MTU associated with said session. Thus, in some embodiments, the hub (420) may be further configured to determine whether a copy of at least a second (TCP) packet is in storage, wherein the second (TCP) packet may be associated with said session and may be of a length exceeding the new MTU associated with the session, and upon so determining to fragment the at least second (TCP) packet and to send the fragmented at least second (TCP) packet toward the destination (460). Moreover, the hub (420) may be further configured to receive a third (TCP) packet from the terminal (440), to determine that the third (TCP) packet may be associated with the session corresponding to the first (TCP) packet and that the third (TCP) packet may be of a length exceeding the new MTU associated with said session, and upon so determining to fragment the third (TCP) packet in accordance with the new MTU associated with said session and to transmit the fragmented third (TCP) packet toward the destination (460).

On the other side of the satellite link, the terminal (440) may be configured to receive an indication (e.g., from the hub (420)) including a new MTU associated with a session and to update the session's MTU in accordance with the indicated new MTU. The terminal (440) may be further configured to determine for a fourth (TCP) packet arriving from the source (450) whether the fourth (TCP) packet is associated with said session and whether its size exceeds the updated MTU associated with the session. The terminal (440) may be configured to discard the fourth (TCP) packet upon determining that its length exceeds the updated MTU and to send a PTB message corresponding to the discarded fourth (TCP) packet toward the source (450), wherein, if the link between the source (450) and the terminal (440) may be an IPv6 link, said PTB message may be an ICMP PTB message. Furthermore, the terminal (440) may be configured not to fragment any packet arriving from the source (450) regardless of whether that packet is received from the source (450) before or after receiving (e.g., from hub (420)) an indication with a new MTU.

It shall be appreciated by any person skilled in the art that the example shown in FIG. 3 may be reversed, i.e., a (TCP) packet may be sent from a source connected to the network (430), via the hub (420), to a destination connected to the terminal (440) and that reversing the roles of the hub (420) and the terminal (440) in the above description may apply to that opposite example. In other words, for (TCP) packets sent from a source connected (e.g., via a network) to the hub (420) to a destination connected to the terminal (440), the hub (420) may be configured as described above for the terminal (440) and the terminal (440) may be configured as described above for the hub (420).

Various aspects of the disclosure may be embodied as one or more methods, systems, apparatuses (e.g., components of a satellite communication network), and/or computer program products. Accordingly, those aspects may take the form of an entirely hardware embodiment, an entirely software embodiment, an entirely firmware embodiment, or an embodiment combining firmware, software, and/or hardware aspects. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In some embodiments, one or more computer readable media storing instructions may be used. The instructions, when executed, may cause one or more apparatuses to perform one or more acts described herein. The one or more computer readable media may comprise transitory and/or non-transitory media. In addition, various signals representing data or events as described herein may be transferred between a source and a destination in the form of electromagnetic waves traveling through signal-conducting media such as metal wires, optical fibers, and/or wireless transmission media (e.g., air and/or space).

Modifications may be made to the various embodiments described herein by those skilled in the art. For example, each of the elements of the aforementioned embodiments may be utilized alone or in combination or sub-combination with elements of the other embodiments. It will also be appreciated and understood that modifications may be made without departing from the true spirit and scope of the present disclosure. The description is thus to be regarded as illustrative instead of restrictive on the present disclosure.

What is claimed is:

1. A method, comprising:
   receiving, by a second node, from a first node, and over a first link, a first packet associated with a session;
   storing, by the second node, a copy of the first packet associated with the session;
   transmitting, by the second node, toward a destination, and over a second link, the first packet associated with the session;
   responsive to transmitting the first packet associated with the session over the second link, receiving, by the second node, a message indicating that the first packet is too big to transmit over a third link of a first network, the message comprising an indication of a maximum transmission unit associated with the third link of the first network;
   responsive to receiving the message indicating that the first packet is too big to transmit over the third link of the first network, determining, by the second node, a new maximum transmission unit for the session based at least in part on the indication of the maximum transmission unit associated with the third link of the first network in the message;
   fragmenting, by the second node, in accordance with the new maximum transmission unit for the session, and responsive to a determination that an acknowledgement message associated with the first packet has already been transmitted by the first node, the first packet into a plurality of packets that comprise information from the first packet; and
   transmitting, by the second node, toward the destination, and over the second link, the plurality of packets that comprise information from the first packet.

2. The method of claim 1, comprising transmitting, by the second node, to the first node, and over the first link, an indication comprising the new maximum transmission unit for the session.

3. The method of claim 1, comprising:
   identifying, in a storage associated with the second node, a second packet associated with the session;
   determining that a size of the second packet associated with the session exceeds said new maximum transmission unit for the session;
   fragmenting, by the second node and in accordance with said new maximum transmission unit for the session, the second packet into a plurality of packets that comprise information from the second packet; and
   transmitting, by the second node, toward the destination, and over the second link, the plurality of packets that comprise information from the second packet.

4. The method of claim 1, comprising:
   receiving, by the second node, from the first node, and over the first link, a third packet associated with the session;
   determining, by the second node, that the third packet is associated with the session;
   determining, by the second node, that a size of the third packet associated with the session exceeds the new maximum transmission unit for the session;
   fragmenting, by the second node and in accordance with the new maximum transmission unit for the session, the third packet into a plurality of packets that comprise information from the third packet; and
   transmitting, by the second node, toward the destination, and over said second link, the plurality of packets that comprise information from the third packet.

5. The method of claim 1, wherein the first link and the second link are part of a second network, and wherein the second network is different than the first network.

6. The method of claim 1, wherein determining the new maximum transmission unit for the session comprises determining the new maximum transmission unit for the session further based on one or more fragmentation policies.

7. The method of claim 6, wherein the one or more fragmentation policies comprise at least one of:
   a policy indicating that the new maximum transmission unit for the session should be set to the maximum transmission unit associated with the second link;
   a policy indicating that the new maximum transmission unit for the session should be set to a lowest supported maximum transmission unit;
   a policy indicating that the new maximum transmission unit for the session should be set in accordance with a number of received packet too big messages associated with said session and a maximum number of maximum transmission unit changes allowed in a session, said number of received packet too big messages associated with said session including a last received packet too big message associated with said session;
   a policy indicating that the new maximum transmission unit for the session should be set, in accordance with one or more algorithms and a stored history of maximum transmission unit changes, to a value in between the maximum transmission unit associated with the second link and the lowest supported maximum transmission unit; and
   a policy indicating that the new maximum transmission unit for the session should be set in accordance with a predefined maximum transmission unit.

8. The method of claim 7, comprising setting the new maximum transmission unit for the session in accordance with the number of received packet too big messages associated with said session, wherein setting the new maximum transmission unit for the session in accordance with the number of received packet too big messages associated with said session comprises:
   determining whether the number of received packet too big messages is lower than said maximum number of maximum transmission unit changes allowed in a session;
   responsive to determining that the number of received packet too big messages is lower than said maximum number of maximum transmission unit changes allowed in a session, setting the new maximum transmission unit for the session to the maximum transmission unit associated with the second link; and
   responsive to determining that the number of received packet too big messages is not lower than said maximum number of maximum transmission unit changes allowed in a session, setting the new maximum transmission unit for the session to the lowest supported maximum transmission unit.

9. The method of claim 1, wherein said first packet is a Transmission Control Protocol (TCP) packet and wherein said session is a TCP session.

10. The method of claim 1, wherein said first link comprises a satellite link.

11. The method of claim 1, comprising employing a Transmission Control Protocol (TCP) acceleration technique over the first link.

12. The method of claim 1, wherein the second link supports Internet Protocol version 6 (IPv6), and wherein receiving the indication that the first packet is too big comprises receiving an Internet Control Message Protocol (ICMP) packet.

13. A method, comprising:
receiving, at a first node and from a source connected to the first node by a first link, a first packet associated with a session, wherein the session is associated with a first maximum transmission unit;
transmitting, by the first node, toward a destination, and via a second node, the first packet associated with the session, the second node being connected to the first node by a second link, and wherein the first node and the second node are part of a first network;
receiving, by the first node, an indication sent from the second node, the indication including a second maximum transmission unit indication associated with a second network through which packets associated with the session are to be transmitted;
updating, by the first node, the first maximum transmission unit for the session in accordance with the second maximum transmission unit indication associated with the second network through which packets associated with the session are to be transmitted;
receiving, by the first node and from the source, a second packet associated with the session;
determining, by the first node, that the second packet is associated with the session;
determining, by the first node, that a size of the second packet associated with the session exceeds the first maximum transmission unit for the session; and
responsive to determining that the second packet is associated with the session and that the size of the second packet associated with the session exceeds the first maximum transmission unit for the session, discarding, by the first node, the second packet associated with the session.

14. The method of claim 13, comprising, transmitting by the first node and toward the source, a packet too big indication corresponding to the second packet associated with the session.

15. The method of claim 13, comprising configuring the first node to:
not fragment packets received from the source over the first link; and
not retransmit packets over the second link due to a need to fragment.

16. The method of claim 13, wherein said first packet is a Transmission Control Protocol (TCP) packet and wherein said session is a TCP session.

17. The method of claim 13, wherein said second link comprises a satellite link.

18. The method of claim 13, comprising:
employing a Transmission Control Protocol (TCP) acceleration technique over the second link; and
responsive to receiving a TCP packet over the first link:
generating a TCP acknowledgement corresponding to the TCP packet; and
transmitting, over the first link, the TCP acknowledgment corresponding to the TCP packet.

19. The method of claim 14, wherein the first link supports Internet Protocol version 6 (IPv6), and wherein transmitting by the first node and toward the source, a packet too big indication corresponding to the second packet comprises transmitting an Internet Control Message Protocol (ICMP) packet.

20. A hub, configured to:
receive, from a terminal and over a satellite link, a first packet associated with a session;
store a copy of the first packet associated with the session;
transmit, toward a destination and over a first link of a network, the first packet associated with the session, wherein the first link is different from the satellite link;
receive, from a node associated with the first link, a message indicating that the first packet is too big to transmit over a second link of the network, the message comprising a maximum transmission unit associated with the second link of the network;
responsive to receiving the message indicating that the first packet is too big to transmit over the second link of the network, determine, in accordance with the maximum transmission unit associated with the second link of the network and a packet fragmentation policy, a new maximum transmission unit for the session;
responsive to a determination that an acknowledgement message associated with the first packet has already been transmitted by the terminal, fragment, in accordance with the new maximum transmission unit for the session, the first packet into a plurality of packets that comprise information from the first packet; and
transmit, toward the destination and over the first link, the plurality of packets that comprise information from the first packet.

21. The hub of claim 20, wherein the hub is configured to transmit, to the terminal, an indication including the new maximum transmission unit for the session.

22. The hub of claim 20, wherein the hub is configured to:
identify, in a storage associated with the hub, a second packet associated with the session;
determine that a size of the second packet associated with the session exceeds said new maximum transmission unit for the session;
fragment, in accordance with said new maximum transmission unit for the session, the second packet into a plurality of packets that comprise information from the second packet; and
transmit, toward the destination and over the first link, the plurality of packets that comprise information from the second packet.

23. The hub of claim 20, wherein the hub is configured to:
receive, from the terminal and over the satellite link, a third packet associated with the session;
determine that the third packet is associated with the session;
determine that a size of the third packet associated with the session exceeds the new maximum transmission unit for the session;

fragment, in accordance with the new maximum transmission unit for the session, the third packet into a plurality of packets that comprise information from the third packet; and transmit, toward the destination and over the first link, the plurality of packets that comprise information from the third packet.

24. The hub of claim 20, wherein said first packet is a Transmission Control Protocol (TCP) packet, the session is a TCP session, and the hub is configured to employ at least one TCP acceleration method over the satellite link.

25. The hub of claim 20, wherein the first link supports Internet Protocol version 6 (IPv6), and wherein the indication that the first packet is too big comprises an Internet Control Message Protocol (ICMP) packet.

26. The hub of claim 20, wherein the hub is configured to:

receive, from a source and via the first link, a fourth packet, said fourth packet being associated with a different session;

transmit, to the terminal and over the satellite link, the fourth packet;

receive, from the terminal, an indication including a new maximum transmission unit associated with the different session;

update, in accordance with the new maximum transmission unit associated with the different session, a maximum transmission unit for the different session;

receive, from the source, a fifth packet, said fifth packet being associated with the different session;

determine that the fifth packet is associated with said different session;

determine whether a size of the fifth packet exceeds the maximum transmission unit for the different session; and responsive to determining that the fifth packet is associated with said different session and that the size of the fifth packet exceeds the maximum transmission unit for the different session, discard the fifth packet.

27. The hub of claim 26, wherein the hub is configured to transmit, toward the source and via the first link, a packet too big indication corresponding to the fifth packet.

28. The hub of claim 27, wherein the first link supports Internet Protocol version 6 (IPv6), and wherein the packet too big indication corresponding to the fifth packet comprises an Internet Control Message Protocol (ICMP) packet.

29. The hub of claim 26, wherein the hub is configured to not fragment packets received from the source and not retransmit packets over the satellite link due to a need to fragment.

* * * * *